Figure 1:
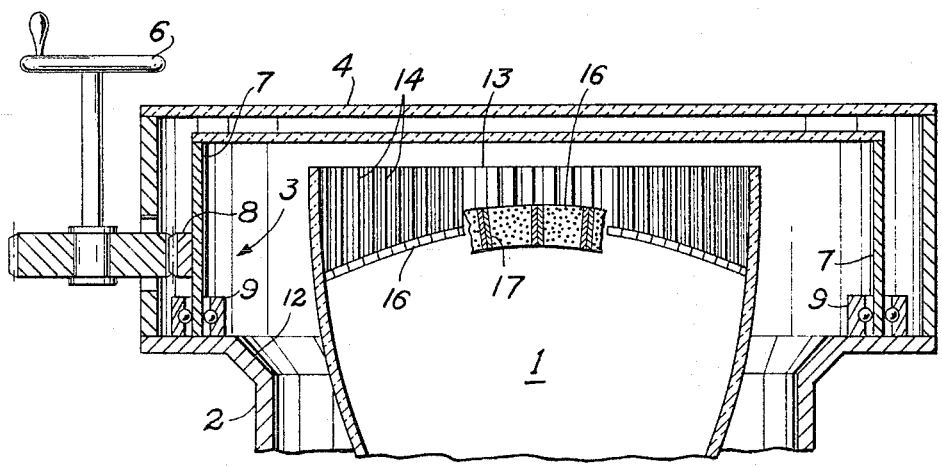

Oct. 4, 1966    E. E. McCOWN    3,277,239
RADAR PLOTTING APPARATUS
Filed April 20, 1964

INVENTOR.
EVERETT E. McCOWN
BY
ATTORNEYS 3,277,239
RADAR PLOTTING APPARATUS
Everett E. McCown, San Diego, Calif., assignor to the United States of America as represented by the Secretary of the Navy
Filed Apr. 20, 1964, Ser. No. 361,625
3 Claims. (Cl. 178—7.83)

The invention described herein may be manufactured and used by or for the Government of the United States of America for governmental purposes without the payment of any royalties thereon or therefor.

The present invention relates generally to PPI (plan position indicator) equipment.

PPI equipment customarily employs a cathode ray tube (CRT) mounted in a cabinet with its tube face or screen viewable through an opening in an upper wall of the cabinet. When used for plotting, a transparent glass or Lucite plotting surface covers the tube screen so that an operator, upon noting signals of interest, can plot the information as it appears on the plotting surface. Usually the plotting surface is physically spaced from the tube and a cursor rotates beneath the surface to facilitate bearing determinations.

One of the problems experienced with such PPI's arises because of the physical spacing between the plotting surface and the tube screen and also because of the fact that the tube screen usually has a convex curvature rather than an optically flat one. Consequently, a parallax often is present between the light spot on the convex tube screen and the image of the spot as it appears on the physically-spaced plotting surface. Because of the parallax and other optical phenomena, the plots may involve substantial inaccuracies which in a number of recent displays are sufficiently significant to require corrective measures.

By way of example, one such measure is the use of a pair of precision-ground optical plates disposed to project the radiation of the tube screen into the plane of the plotting surface. Although these plates achieve their purpose, they obviously involve a substantial expense and, further, they unnecessarily complicate the equipment.

Another common PPI problem is that of obtaining maximum brilliance while maintaining optimum contrast and resolution. Again, the spacing of the plotting surface attenuates the light as well as accentuates the undesirable light scattering which is initiated within the phosphor layer of the screen. In this regard, it is known that increases in the thickness of the phosphor layer or in applied voltage results in increased brilliance. However, these increases also result in a sacrifice of contrast and resolution due to an increased light scattering propensity. In practice, brilliance frequently is compromised, although the sacrifice is minimized by materially reducing the ambient light level in which the equipment is operated. However, low ambient light handicaps other operations being conducted in the immediate vicinity of the equipment.

It is therefore an object of the present invention to provide plotting apparatus of the type under consideration which not only avoids plotting inaccuracies due to parallax and other optical phenomena but also improves the resolution and contrast of the target information appearing on the plotting surface.

Another object is to provide a simple, economic and unusually accurate plotting apparatus capable of being used with a relatively ambient light level.

These and other objects of the present invention are met by utilizing light-conducting fibers to project the target information onto a flat surface which, in turn, may be covered by a spaced transparent or translucent plotting surface. Although various types of fibers may be employed, it is preferred to use an arrangement such as is disclosed in S. M. MacNeille's U.S. Patent No. 2,985,784, entitled "Optical Image-Forming Devices."

Figure 2:
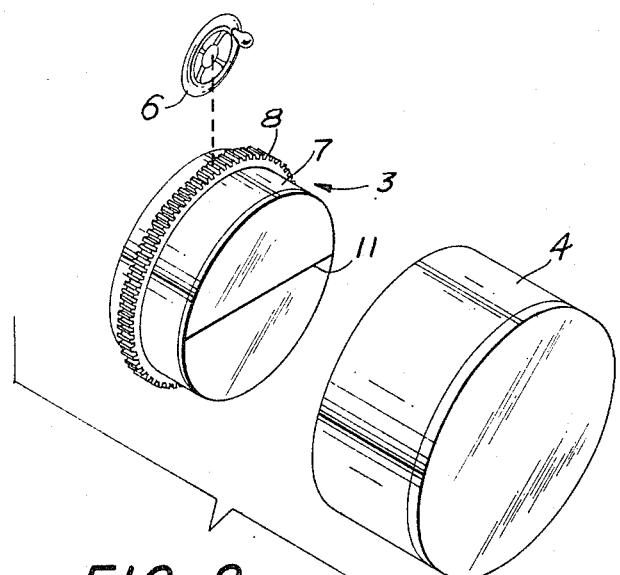

The invention is illustrated in the accompanying drawings of which:

FIG. 1 is a schematic representation of a PPI equipment showing the upper portion of a cathode ray tube mounted in a suitable cabinet a portion of the tube screen being greatly enlarged to facilitate illustration of construction details; and FIG. 2 is an exploded view of two of the elements shown in FIG. 1.

Referring to the drawings, it will be seen that cathode ray tube 1 is mounted in a cabinet 2 which is formed to mount a cursor plot 3 and a plotting plate 4.

Except for certain features, it will be understood that the apparatus depicted in the drawings is intended to be entirely conventional. As shown the CRT is mounted on its vertical axis with its face or screen projecting into an opening in the upper wall of the cabinet. Cursor 3 is rotatably carried by the cabinet or, if desired, it can be rotatably mounted on the tube itself. A hand wheel 6 having appropriate drive shafts and gear connections may be used for rotatably driving the cursor.

In the particular embodiment shown in FIG. 1, cursor 3 is formed of a ring portion 7 mounting a ring gear 8 to which the rotation of hand wheel 6 is imparted. Appropriate bearing or anti-friction mountings, indicated by bearing blocks 9, may be provided for the cursor. Also, as seen in FIG. 2, the top surface of cursor 3 is formed with a diametrical line 11 used to ascertain the relative bearing of a target appearing on the face of the tube. Bearing indices in degrees may be inscribed either on a portion of the cabinet, such as portion 12, or, if desired, directly etched on stationary plotting plate 4.

In use, light generated by the tube appears on its screen or face 13 where it is viewed by an operator standing over the equipment. However, as previously noted, the operator usually has been required to view the image of a light spot emanating from a convex surface and projected through the cursor plot to the spaced plotting surface. Consequently, his plots may involve substantial inaccuracies because of optical distortions.

One of the features of the present invention resides in avoiding these distortions by employing an optically flat tube face 13 and also by employing a flat plotting ring 4 disposed closely adjacent to the tube face. To provide the optically flat surface for face 13, bundles of light-conducting fibers 14 extend outwardly from a convex phosphor layer 16 and terminate in a common plane. Most suitably, the present invention employs the image-forming face plate described in previously-mentioned U.S. Patent No. 2,985,784. Although reference to that patent may be obtained for a fuller understanding of its principles it can be noted that this face plate employs a special phosphor layer 16 which utilizes a particular cellular structure to avoid undesirable scattering and spreading of the image. In particular, layer 16 is made up of a plurality of cells, formed by opaque partition walls 17, the phosphorescent material being incorporated in each of the cells. As a result, light generated within any particular cell is reflected by the opaque, reflective cell walls into the light-conducting filament which is disposed adjacent to the cell. If such a cellular structure were not employed, light generated within phosphor layer 16 could spread or scatter laterally throughout the layer to reduce contrast and resolutions.

One particular advantage of the cellular structure is that it permits a greater thickness in the phosphor layer as well as the application of increased voltage. Both of these conditions produce a substantially increased brilliance and, as earlier indicated, the brilliance is not gained at a sacrifice of contrast because light-scattering is held to a limited minimum by the cell structure. As would be surmised, the fibers are tightly bound together, as well as to the phosphor so as to provide an air-tight CRT tube which, of course, is a vacuum tube.

It will be appreciated that other light-conducting fiber arrangements also may be employed and that the primary consideration in the present invention is one of transporting or transferring light produced in a convex phosphor layer into a common plane. Thus, regardless of the specific nature of the light conducting fibers, it is essential that the fibers project outwardly and terminate in a common plane so as to provide a flat exterior surface for the tube. When such a surface is available, images viewed on the plotting surface of plate 4 should lie in precise alignment with the light spots on the screen or face of the CRT tube. Consequently, even though the plotting surfaces are physically spaced from the exterior surface of the tube, no parallax exists and plots can be accurately made. Another significant advantage of this present arrangement is that the permissible increase in brilliance, resolution and contrast enables the ambient light level in which the equipment is operated to be increased to the advantage or other functions being carried out in the vicinity of the equipment.

Obviously many modifications and variations of the present invention are possible in the light of the above teachings. It is therefore to be understood that within the scope of the appended claims the invention may be practiced otherwise than as specifically described.

What is claimed is:

1. Target plotting apparatus comprising a cathode ray tube having a face plate formed with an interior layer of phosphorescent material and with a plurality of light-conducting fibers projecting outwardly from said phosphorescent layer, said layer having a convex curvature and said fibers terminating at their outer ends in a common plane for forming a flat exterior surface for said face plate, said fibers and phosphorescent layer being tightly bound together for forming an air-tight face plate, a flat translucent plotting plate covering and disposed in close proximity to said exterior face plate surface, and a cursor disposed beneath said plotting plate and rotatable relative thereto for plotting target bearing.

2. The apparatus of claim 1 wherein said cursor is formed of a flat translucent plate, said apparatus further including means for rotating said cursor plate.

3. The apparatus of claim 1 wherein said phosphorescent layers are formed of a plurality of contiguous cells having partition wall portions formed of light-reflective material, said cells containing said phosphorescent material.

References Cited by the Examiner

UNITED STATES PATENTS

| | | | |
|---|---|---|---|
| 2,528,142 | 10/1950 | Herzlinger | 178—7.83 X |
| 2,696,610 | 12/1954 | Turley | 178—7.83 |
| 2,985,784 | 5/1961 | MacNeille. | |

DAVID G. REDINBAUGH, *Primary Examiner.*

R. RICHARDSON, *Assistant Examiner.*